US012811310B2

(12) United States Patent
Chen et al.

(10) Patent No.: US 12,811,310 B2
(45) Date of Patent: Nov. 24, 2026

(54) ACTIVE ANTENNA DEVICE AND COMMUNICATION DEVICE

(71) Applicant: ZTE CORPORATION, Shenzhen (CN)

(72) Inventors: Jianqiang Chen, Shenzhen (CN); Jialin Shen, Shenzhen (CN); Fei Cao, Shenzhen (CN); Dianping Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 135 days.

(21) Appl. No.: 18/879,848

(22) PCT Filed: Jun. 14, 2023

(86) PCT No.: PCT/CN2023/100232

§ 371 (c)(1),
(2) Date: Dec. 30, 2024

(87) PCT Pub. No.: WO2024/001786

PCT Pub. Date: Jan. 4, 2024

(65) Prior Publication Data

US 2026/0261053 A1 Sep. 3, 2026

(30) Foreign Application Priority Data

Jun. 28, 2022 (CN) ........................ 202210740917.X

(51) Int. Cl.
*H01Q 21/00* (2006.01)
*H01Q 1/00* (2006.01)
(Continued)

(52) U.S. Cl.
CPC ......... *H01Q 21/0006* (2013.01); *H01Q 1/002* (2013.01); *H01Q 1/24* (2013.01);
(Continued)

(58) Field of Classification Search
CPC ...... H01Q 21/0006; H01Q 1/002; H01Q 1/24; H01Q 1/36; H01Q 23/00; H04B 1/44
See application file for complete search history.

(56) References Cited

U.S. PATENT DOCUMENTS

2012/0028690 A1* 2/2012 Liu ........................ H01Q 1/246 455/571
2017/0012681 A1 1/2017 Buliga et al.
(Continued)

FOREIGN PATENT DOCUMENTS

CN 106060199 A 10/2016
CN 106558769 A 4/2017
CN 216793989 U 6/2022

OTHER PUBLICATIONS

European Search Report for corresponding application EP 23 82 9968; Mail date Sep. 23, 2025.
(Continued)

*Primary Examiner* — Hai V Tran
(74) *Attorney, Agent, or Firm* — CANTOR COLBURN LLP

(57) ABSTRACT

The present application discloses an active antenna device (100) and a communication device. The active antenna device (100) comprises a communication mainboard (200), an antenna feeder set and an antenna module (400). The antenna feeder set comprises a first transmission line (310) and a second transmission line (320), The first transmission line (310) is configured to transmit a first radio frequency signal (TX) and a first control signal (C0), and the second transmission line (320) is configured to transmit a second radio frequency signal (RX) and a second control signal (C1). A front-end amplifier module (410) is arranged between the antenna feeder set and the antenna array (420). The transmission feeder unit (411) is configured to acquire the first radio frequency signal (TX) and the first control
(Continued)

signal (C0) from the first transmission line (310). A receiving feeder unit (412) is configured to transmit the second radio frequency signal (RX) from the antenna array (420) to the communication mainboard (200) by means of the second transmission line (320) and acquire the second control signal (C1) from the second transmission line (320).

20 Claims, 2 Drawing Sheets

(51) Int. Cl.

| | |
|---|---|
| ***H01Q 1/24*** | (2006.01) |
| ***H01Q 1/36*** | (2006.01) |
| ***H01Q 23/00*** | (2006.01) |
| ***H04B 1/44*** | (2006.01) |

(52) U.S. Cl.
CPC ............... *H01Q 1/36* (2013.01); *H01Q 23/00* (2013.01); *H04B 1/44* (2013.01)

(56) References Cited

U.S. PATENT DOCUMENTS

| | | | | |
|---|---|---|---|---|
| 2017/0094671 | A1* | 3/2017 | Emmanuel | H03H 11/348 |
| 2017/0099608 | A1* | 4/2017 | Lam | H04B 1/16 |
| 2019/0386397 | A1* | 12/2019 | Son | H04B 1/006 |
| 2021/0013922 | A1* | 1/2021 | Watanabe | H04B 1/44 |

OTHER PUBLICATIONS

International Search Report for Application No. PCT/CN2023/100232, dated Jul. 24, 2023, 2 pages, English Translation.

* cited by examiner

ACTIVE ANTENNA DEVICE AND COMMUNICATION DEVICE

CROSS-REFERENCE TO RELATED APPLICATION

The disclosure is a national stage filing under 35 U.S.C. § 371 of international application number PCT/CN2023/100232, filed Jun. 14, 2023, which filed on the basis of Chinese Patent Application No. 202210740917.X, filed on Jun. 28, 2022, and claims the priority to the Chinese Patent Application, which is incorporated in its entirety herein by reference.

TECHNICAL FIELD

The disclosure relates to the technical field of communication, and particularly relates to an active antenna apparatus and a communication device.

BACKGROUND

With rapid development of intelligent terminal devices and mobile internet services at present, demand for real-time performance and mobile availability of various online data services has been boosted tremendously. Compared with a mobile cellular network, a wireless local area networks (WLAN) technology has advantages of high bandwidth and low cost. Thus, it has been widely used in a wide range of scenes such as homes, enterprises, campuses and cities as a popular network access technology.

New opportunities and challenges have been presented to the WLAN antenna technology due to development of wireless terminal devices and rapid growth of wireless data traffic. A WLAN antenna in the related art and a wireless communication transceiver at a front end of a mainboard are generally separated from each other and are connected together through an antenna feeder. However, a noise coefficient of a receiver is increased by loss of the antenna feeder, thus reducing sensitivity of an entire machine. In addition, output of a power amplifier is affected by the loss of the antenna feeder, and transmission power is reduced accordingly. This will lead to a decrease in power amplification efficiency of a transmitter and a reduction in reliability of information transmission of a wireless communication system. Meanwhile, a circuit will be complex in implementation solution and structure and large in size, failing to satisfy layout space demand of a complex feeding network.

SUMMARY

The disclosure provides an active antenna apparatus and a communication device.

In a first aspect, an example of the disclosure provides an active antenna apparatus. The active antenna apparatus includes a communication mainboard, an antenna feeder group, and an antenna module. The antenna feeder group is connected to the communication mainboard. The antenna feeder group includes a first transmission line and a second transmission line. The first transmission line is configured to transmit a first radio frequency signal and a first control signal. The second transmission line is configured to transmit a second radio frequency signal and a second control signal. The antenna module is connected to the antenna feeder group. The antenna module includes a front-end amplifying module and an antenna array. The front-end amplifying module is arranged between the antenna feeder group and the antenna array. The front-end amplifying module includes a transmission feeding unit and a reception feeding unit. The transmission feeding unit is configured to obtain the first radio frequency signal and the first control signal from the first transmission line. The reception feeding unit is configured to transmit the second radio frequency signal from the antenna array to the communication mainboard through the second transmission line and obtain the second control signal from the second transmission line.

In a second aspect, an example of the disclosure provides a communication device. The communication device includes the active antenna apparatus according to the example of the first aspect of the disclosure.

DETAILED DESCRIPTION OF THE EMBODIMENTS

This part will describe examples of the disclosure in detail. Preferred examples of the disclosure are shown in accompanying drawings. The accompanying drawings are used to supplement description of a text part of the description with graphics, such that people can intuitively and vividly understand all technical features and an overall technical solution of the disclosure. However, the drawings cannot be understood as limiting the protection scope of the disclosure.

In the description of the disclosure, “several” indicates one or more, “a plurality of” indicates two or above, “greater than, smaller than, exceeding, etc.” are understood as excluding the number, and “above, below, within, etc.” are understood as including the number. If “first” and “second” in the description are only for distinguishing technical features, it cannot be understood as indicating or implying relative importance, implicitly indicating a number of indicated technical features, or implicitly indicating a sequence of indicated technical features.

In the description of the disclosure, unless otherwise specified, words such as “arrange”, “mount” and “connect” should be broadly understood, and those skilled in the art can rationally determine meanings of the words in the disclosure in combination with contents of technical solutions.

A wireless local area networks (WLAN) antenna in the related art and a wireless communication transceiver at a front end of a mainboard are generally separated from each other and are connected together through an antenna feeder. However, loss of the antenna feeder can increase a noise coefficient of a receiver, thus reducing sensitivity of an entire machine. In addition, output of a power amplifier is affected by the loss of the antenna feeder, and transmission power is reduced accordingly. This will lead to a decrease in power amplification efficiency of a transmitter and a reduction in reliability of information transmission of a wireless communication system. Meanwhile, a circuit will be complex in implementation solution and structure and large in size, failing to satisfy layout space demand of a complex feeding network.

The examples of the disclosure provide an active antenna apparatus and a communication device. Through a feeding solution of transmission line multiplexing, a space required for complex feeding network layout can be expanded, and a structure can be miniaturized advantageously.

The examples of the disclosure will be further described below with reference to the accompanying drawings.

Figure 1:
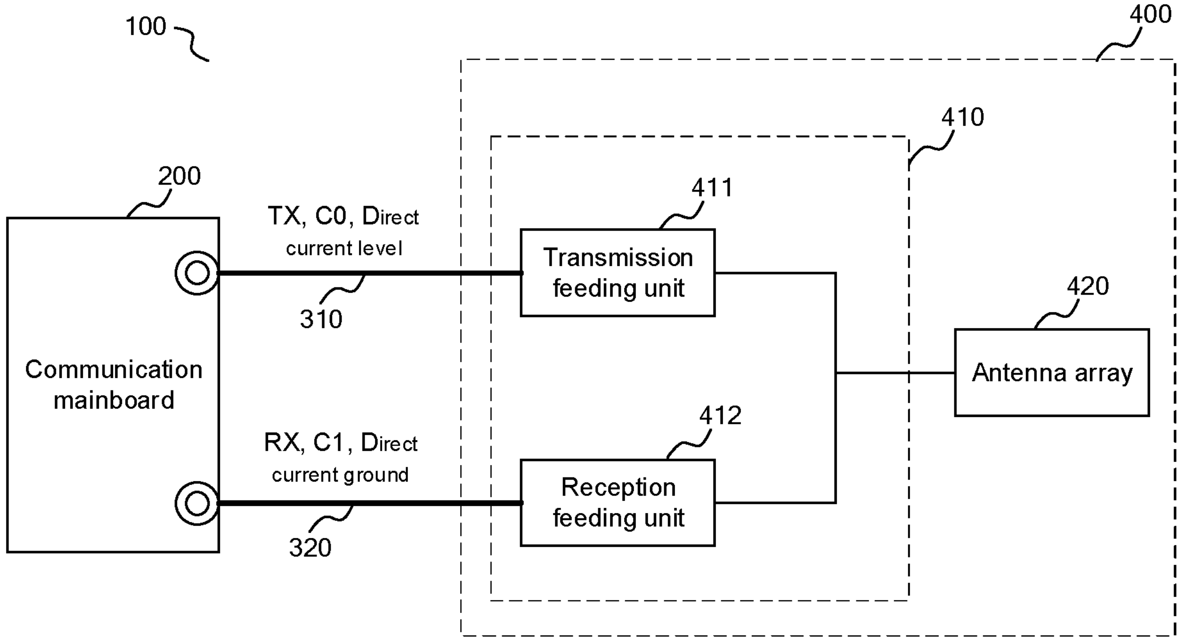
FIG. 1 is a schematic structural diagram of an active antenna apparatus according to one example of the disclosure.
Figure 2:
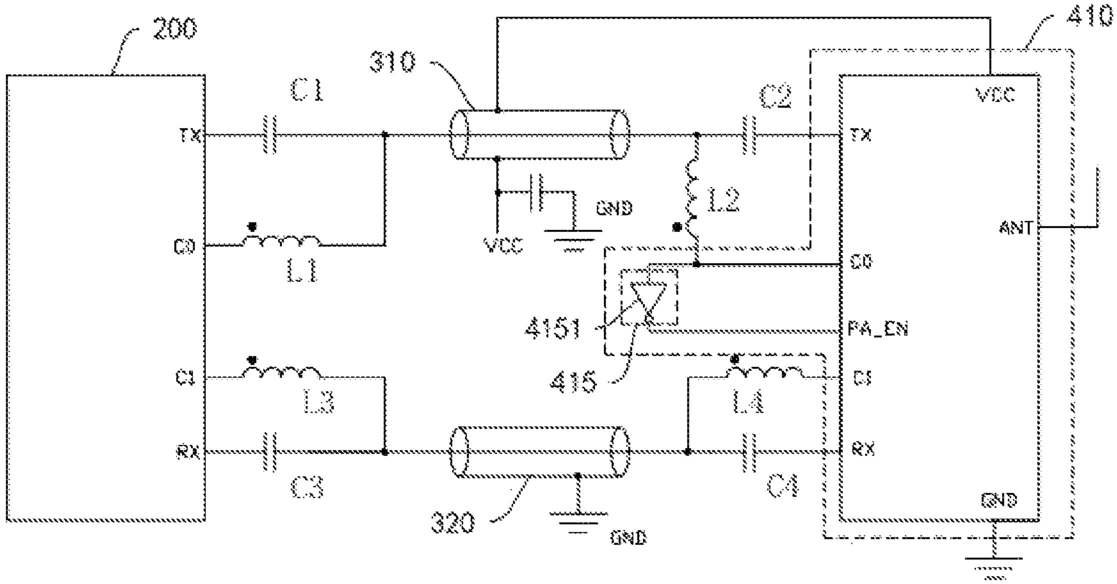
FIG. 2 is a schematic diagram of a local circuit of an active antenna apparatus according to another example of the disclosure.

As shown in FIGS. 1 and 2, an example of a first aspect of the disclosure provides an active antenna apparatus 100. The active antenna apparatus includes a communication mainboard 200, an antenna feeder group, and an antenna module 400. The antenna feeder group is connected to the communication mainboard 200. The antenna feeder group includes a first transmission line 310 and a second transmission line 320. The first transmission line 310 is configured to transmit a first radio frequency signal TX and a first control signal C0. The second transmission line 320 is configured to transmit a second radio frequency signal RX and a second control signal C1. The antenna module 400 is connected to the antenna feeder group. The antenna module 400 includes a front-end amplifying module 410 and an antenna array 420. The front-end amplifying module 410 is arranged between the antenna feeder group and the antenna array 420. The front-end amplifying module 410 includes a transmission feeding unit 411 and a reception feeding unit 412. The transmission feeding unit 411 is configured to obtain the first radio frequency signal TX and the first control signal C0 from the first transmission line 310. The reception feeding unit 412 is configured to transmit the second radio frequency signal RX from the antenna array 420 to the communication mainboard 200 through the second transmission line 320 and obtain the second control signal C1 from the second transmission line 320.

In the active antenna apparatus 100 according to the example, the antenna array 420 is configured to transmit and receive a wireless signal. The front-end amplifying module 410 is arranged between the antenna feeder group and the antenna array 420, and the front-end amplifying module 410 is integrated with the antenna array 420 in the antenna module 400, such that a noise coefficient can be effectively reduced, gain can be improved, and reliability of wireless signal transmission can be improved advantageously. The communication mainboard 200 transmits the first radio frequency signal TX and the first control signal C0 to the transmission feeding unit 411 through the first transmission line 310, and finally the signals are transmitted through the antenna array 420. The communication mainboard 200 transmits the second control signal C1 to the reception feeding unit 412 through the second transmission line 320, and meanwhile, the reception feeding unit 412 transmits the second radio frequency signal RX received by the antenna array 420 to the communication mainboard 200 through the second transmission line 320. Both the first transmission line 310 and the second transmission line 320 may conduct combined transmission of a radio frequency signal and a control signal, and the radio frequency signal and the control signal are separated in the antenna module 400. Through a feeding solution of transmission line multiplexing, a space required for complex feeding network layout can be expanded, and a structure can be miniaturized advantageously.

It may be understood that the first radio frequency signal TX is a transmission radio frequency signal, the first control signal C0 is a transmission control signal, and the first radio frequency signal TX and the first control signal C0 are signals required by the active antenna apparatus 100 in a transmission state; and the second radio frequency signal RX is a reception radio frequency signal, the second control signal C1 is a reception control signal, and the second radio frequency signal RX and the second control signal C1 are signals required by the active antenna apparatus 100 in a reception state.

It may be understood by those skilled in the art that the active antenna apparatus 100 shown in FIGS. 1 and 2 does not limit the example of the disclosure. The active antenna apparatus may include more or fewer components than those shown in the figure, combine some components, or have different component arrangements. For instance, corresponding components are arranged in the front-end amplifying module 410 to implement signal amplification.

According to layout requirements of a complex feeding network of the antenna module 400, through the feeding solution of transmission line multiplexing, the control signal may be transmitted while the radio frequency signal is transmitted, such that a structure of the feeding network is simplified, a high-density feeding panel is simply and conveniently connected to the antenna module 400, and a structural design space is effectively reduced.

The active antenna apparatus 100 of the disclosure can effectively reduce a noise coefficient and improve gain. A related implementation principle will be introduced below.

A noise coefficient cascade formula is as follows:

$$NF\text{ total}=NF1+(NF2-1)/G1+\ldots(NFn-1)/(G1*\ldots*Gn-1);\text{ and}$$

NF total denotes a total noise coefficient of a link, NF1 denotes a first-stage noise coefficient, NF2 denotes a second-stage noise coefficient, NFn denotes an nth-stage noise coefficient, G1 denotes first-stage gain, G2 denotes second-stage gain, and Gn denotes nth-stage gain.

As may be seen from the noise coefficient cascade formula, the first-stage noise coefficient and gain are crucial, and the first-stage gain needs to be maximized while the first-stage noise coefficient needs to be minimized in a solution designing process. However, an existing antenna solution is generally direct connection to a wireless communication transceiver at a front end of a mainboard through an antenna feeder. Loss of the antenna feeder may increase with increase in length of the antenna feeder, and is generally about 2 dB. This loss may directly be added to the first-stage noise coefficient and may also reduce the first-stage gain. Different from an existing antenna solution, the disclosure arranges the front-end amplifying module 410 in the antenna module 400 and integrates the front-end amplifying module with the antenna array 420, such that the noise coefficient can be directly reduced, the gain can be improved, a noise coefficient of a receiver can be effectively reduced, and a signal-to-noise ratio can be improved. Thus, sensitivity of an entire machine can be improved, power amplification efficiency of a transmitter can be improved advantageously, and wireless signal transmission can be more reliable. Compared with the existing antenna solution, the noise coefficient may be reduced by 3 dB, and the gain may be increased by 2 dB. Accordingly, sensitivity of the entire machine is improved by 3 dB, and transmission power is improved by 2 dB. The active antenna apparatus 100 of the disclosure has characteristics of miniaturization, low noise, high efficiency and high bandwidth, and can improve WLAN coverage performance in user-intensive scenes and complex environment scenes, thus achieving functions of improving throughput, reducing power consumption and enhancing environmental adaptability.

In an example of the disclosure, a plurality of antenna arrays 420 may be arranged, and each of the antenna arrays 420 may have different polarization modes that may be designed according to actual needs. In an example, different polarization modes are designed for the antenna array 420, such that the active antenna apparatus 100 of the disclosure may simultaneously transmit or receive horizontally polarized waves and vertically polarized waves, and reliability of signal transmission can be improved advantageously. In addition, an arrangement angle of each of the antenna arrays 420 may be adjusted, and omnidirectional beams or directional beams may be generated according to different application scenes. For instance, in an application scene (such as a station and an airport) with obvious personnel mobility changes, network requirements of people in all directions may be satisfied by generating omnidirectional beams in a case of a low population density. In a case of a high population density, circumferential scanning may be conducted with dual-polarization high-gain directional beams, such that network requirements in different spatial directions are satisfied. A specific designing method is not limited by the disclosure.

As shown in FIGS. 1 and 2, in the active antenna apparatus 100, the first transmission line 310 includes a first inner core and a first housing. The first inner core is configured to transmit the first radio frequency signal TX and the first control signal C0. The first housing is configured to transmit a direct current level. The first inner core and the first housing are coaxial. The second transmission line 320 includes a second inner core and a second housing. The second inner core is configured to transmit the second radio frequency signal RX and the second control signal C1. The second housing is used as direct current ground. The second inner core and the second housing are coaxial.

In the example, the first transmission line 310 may simultaneously supply power and transmit the first radio frequency signal TX and the first control signal C0. In an example, the direct current level is transmitted by the first housing, such that power is supplied to the front-end amplifying module 410. The first inner core is arranged in the first housing, and the first radio frequency signal TX and the first control signal C0 are transmitted by the first inner core. The second transmission line 320 includes the second housing and the second inner core arranged in the second housing, and the second housing is used as the direct current ground for power supply, such that reliability of power supply is ensured. The second radio frequency signal RX and the second control signal C1 are transmitted by the second inner core, and radio frequencies of the first transmission line 310 and the second transmission line 320 are shared, such that interference can be effectively suppressed.

Through a solution of transmission line multiplexing, signals are transmitted in a combined manner by the first transmission line 310 and the second transmission line 320, and the signals are separated in the transmission feeding unit 411 and the reception feeding unit 412, such that a structural space can be effectively saved.

As shown in FIGS. 1 and 2, the active antenna apparatus 100 further includes a first capacitor C1, a second capacitor C2, a first inductor L1, and a second inductor L2. The first transmission line 310 is connected to the first capacitor C1, the second capacitor C2, the first inductor L1 and the second inductor L2 separately. The communication mainboard 200 transmits the first radio frequency signal TX to the transmission feeding unit 411 through the first capacitor C1, the first transmission line 310, and the second capacitor C2. The communication mainboard 200 transmits the first control signal C0 to the transmission feeding unit 411 through the first inductor L1, the first transmission line 310, and the second inductor L2.

In the example, the first capacitor C1 and the second capacitor C2 are arranged, such that alternating current signal conduction and direct current isolation may be conducted. The first radio frequency signal TX may be transmitted from the communication mainboard 200 to the transmission feeding unit 411 sequentially through the first capacitor C1, the first transmission line 310 and the second capacitor C2. The first inductor L1 and the second inductor L2 are arranged, such that direct current conduction may be conducted. The first control signal C0 may be transmitted from the communication mainboard 200 to the transmission feeding unit 411 sequentially through the first inductor L1, the first transmission line 310 and the second inductor L2. Through conduction of alternating current signals and direct current signals, the first radio frequency signal TX and the first control signal C0 may be transmitted on the first transmission line 310 in a combined manner. Through a solution of transmission line multiplexing, a structure is simple, and an overall size can be effectively reduced.

As shown in FIGS. 1 and 2, the active antenna apparatus 100 further includes a third capacitor C3, a fourth capacitor C4, a third inductor L3, and a fourth inductor L4. The second transmission line 320 is connected to the third capacitor C3, the fourth capacitor C4, the third inductor L3 and the fourth inductor L4 separately. The reception feeding unit 412 transmits the second radio frequency signal RX to the communication mainboard 200 through the fourth capacitor C4, the second transmission line 320, and the third capacitor C3. The communication mainboard 200 transmits the second control signal C1 to the reception feeding unit 412 through the third inductor L3, the second transmission line 320, and the fourth inductor L4.

In the example, the third capacitor C3 and the fourth capacitor C4 are arranged, such that alternating current signal conduction may be conducted. The reception feeding unit 412 transmits the second radio frequency signal RX from the antenna array 420 to the communication mainboard 200 sequentially through the fourth capacitor C4, the second transmission line 320 and the third capacitor C3. The third inductor L3 and the fourth inductor L4 are arranged, such that direct current conduction may be conducted. The second control signal C1 may be transmitted from the communication mainboard 200 to the reception feeding unit 412 sequentially through the third inductor L3, the second transmission line 320 and the fourth inductor L4. Through conduction of alternating current signals and direct current signals, the second radio frequency signal RX and the second control signal C1 may be transmitted on the second transmission line 320 in a combined manner. A solution of transmission line multiplexing can miniaturize a structure advantageously.

Figure 3:
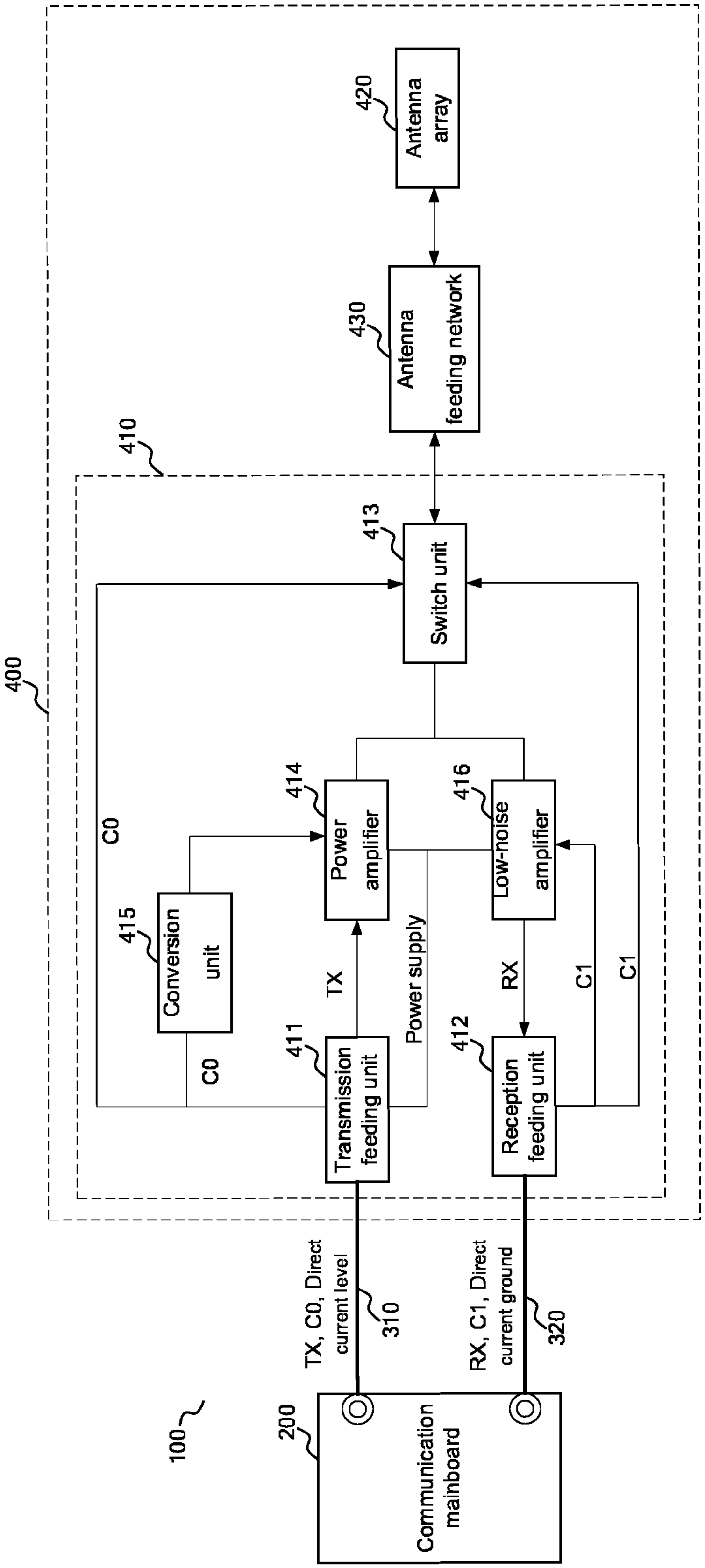
FIG. 3 is a schematic structural diagram of an active antenna apparatus according to yet another example of the disclosure.

As shown in FIG. 3, in the active antenna apparatus 100, the front-end amplifying module 410 further includes a switch unit 413. The switch unit 413 is connected to the transmission feeding unit 411, the reception feeding unit 412 and the antenna array 420 separately. The transmission feeding unit 411 transmits the first control signal C0 to the switch unit 413. The reception feeding unit 412 transmits the second control signal C1 to the switch unit 413. The switch unit 413 is configured to be switched to a transmission state or a reception state.

In the example, the switch unit 413 is switched between the transmission state and the reception state according to the first control signal C0 and the second control signal C1. When the communication mainboard 200 transmits the first radio frequency signal TX and the first control signal C0 to the transmission feeding unit 411 through the first transmission line 310, the transmission feeding unit 411 may separate the first radio frequency signal TX from the first control signal C0 and transmit the first radio frequency signal TX and the first control signal C0 to the switch unit 413. The switch unit 413 is switched to the transmission state according to the first control signal C0, and the first radio frequency signal TX may be transmitted through the antenna array 420. When the communication mainboard 200 transmits the second control signal C1 to the reception feeding unit 412 through the second transmission line 320, the reception feeding unit 412 transmits the second control signal C1 to the switch unit 413. The switch unit 413 is switched to the reception state, and meanwhile, the reception feeding unit 412 obtains the second radio frequency signal RX from the antenna array 420. The second radio frequency signal may be transmitted to the communication mainboard 200 through the second transmission line 320.

As shown in FIG. 3, in the active antenna apparatus 100, the front-end amplifying module 410 further includes a power amplifier 414. The power amplifier 414 is connected to the transmission feeding unit 411 and the switch unit 413 separately. The transmission feeding unit 411 transmits the first radio frequency signal TX and the first control signal C0 to the power amplifier 414. The first radio frequency signal TX is transmitted to the switch unit 413 through the power amplifier 414. The transmission feeding unit 411 transmits the first control signal C0 to the switch unit 413.

In the example, the power amplifier 414 is arranged, such that power amplification may be conducted on a transmission signal. The transmission feeding unit 411 connects the first radio frequency signal TX and the first control signal C0 to the power amplifier 414, and the power amplifier 414 conducts power amplification on the first radio frequency signal TX under the control of the first control signal C0. Meanwhile, the switch unit 413 is switched to the transmission state, and the first radio frequency signal TX enters the switch unit 413 after power amplification. Finally, the first radio frequency signal is transmitted through the antenna array 420, such that transmission power of the active antenna apparatus 100 can be effectively improved.

As shown in FIGS. 2 and 3, in the active antenna apparatus 100, the front-end amplifying module 410 further includes a conversion unit 415. The conversion unit 415 is connected to the transmission feeding unit 411 and the power amplifier 414 separately. The conversion unit 415 is configured to convert the first control signal C0 to a switch control signal PA_EN. The first control signal C0 has a state opposite to that of the switch control signal PA_EN.

In the example, the transmission feeding unit 411 transmits the first control signal C0 to the conversion unit 415, and the conversion unit 415 converts the first control signal C0 to the switch control signal PA_EN. The switch control signal PA_EN is configured to control a working state of the power amplifier 414, such that a requirement of turning on or off the power amplifier 414 is satisfied. The switch control signal PA_EN has a state opposite to that of the first control signal C0 all the time. Inversion of the control signal is implemented by the conversion unit 415, such that aliasing of signal transmission can be reduced, and stability of signal transmission can be ensured.

As shown in FIGS. 2 and 3, in the active antenna apparatus 100, the conversion unit 415 includes an inverter 4151. An input end of the inverter 4151 is connected to the transmission feeding unit 411. An output end of the inverter 4151 is connected to the power amplifier 414.

In the example, the transmission feeding unit 411 inputs the first control signal C0 into the input end of the inverter 4151, and phase inversion of the control signal is implemented by the inverter 4151. In this way, the first control signal C0 is converted to the switch control signal PA_EN. The switch control signal PA_EN may control the working state of the power amplifier 414.

It may be understood that the switch control signal PA_EN has a state opposite to that of the first control signal C0 all the time. If the first control signal C0 is at a high level, the switch control signal PA_EN is at a low level. Similarly, if the first control signal C0 is at a low level, the switch control signal PA_EN is at a high level.

As shown in FIG. 3, in the active antenna apparatus 100, the front-end amplifying module 410 further includes a low-noise amplifier 416. The low-noise amplifier 416 is connected to the reception feeding unit 412 and the switch unit 413 separately. The reception feeding unit 412 transmits the second control signal C1 to the low-noise amplifier 416 and the switch unit 413 separately. The switch unit 413 transmits the second radio frequency signal RX from the antenna array 420 to the reception feeding unit 412 through the low-noise amplifier 416.

In the example, the low-noise amplifier 416 is arranged, such that a reception signal may be amplified, the reception feeding unit 412 may connect the second control signal C1 to the low-noise amplifier 416 and the switch unit 413, and the switch unit 413 is switched to the reception state. The second radio frequency signal RX received by the antenna array 420 passes the switch unit 413 and then enters the low-noise amplifier 416. Under the control of the second control signal C1, the low-noise amplifier 416 amplifies the second radio frequency signal RX, such that the noise coefficient can be effectively reduced, and the signal-to-noise ratio of the output can be improved. The second radio frequency signal RX is amplified and then transmitted to the communication mainboard 200 through the reception feeding unit 412 and the second transmission line 320.

As shown in FIG. 3, in the active antenna apparatus 100, the antenna module 400 further includes an antenna feeding network 430. The antenna feeding network 430 is connected to the switch unit 413 and the antenna array 420 separately.

In the example, the antenna feeding network 430 is arranged, such that impedance matching can be implemented, and quality of signal transmission can be ensured. When the switch unit 413 is switched to the transmission state, the first radio frequency signal TX is transmitted through the switch unit 413, the antenna feeding network 430, and the antenna array 420. When the switch unit 413 is switched to the reception state, the second radio frequency signal RX received by the antenna array 420 enters the front-end amplifying module 410 through the antenna feeding network 430 and the switch unit 413, and is transmitted to the communication mainboard 200 through the second transmission line 320, such that gain of the active antenna apparatus 100 can be improved.

The active antenna apparatus 100 further includes a feeding panel. The antenna module 400 is arranged on the feeding panel.

In the example, the antenna module 400 may be welded to the feeding panel, so as to implement electrical connection between the feeding panel and the antenna module 400.

In an example, a high-density feeding panel may be used to make the structure more compact. Through the feeding solution of transmission line multiplexing, the transmission feeding unit 411 and the reception feeding unit 412 may implement signal separation, such that a space required for complex feeding network layout can be ensured.

In the active antenna apparatus 100, the feeding panel is an FR4 dielectric plate.

In the example, the FR4 dielectric plate is used as the feeding panel. The FR4 dielectric plate belongs to a common material of a printed circuit board (PCB), and is convenient to machine, low in cost, and convenient to mount. Meanwhile, the FR4 dielectric plate has good performance, such that machining of the active antenna apparatus 100 is facilitated, and desirable structural stability is ensured.

An example of a second aspect of the disclosure provides a communication device. The communication device includes the active antenna apparatus 100 according to the example of the first aspect of the disclosure.

As shown in FIGS. 1-3, the communication device according to the example includes the active antenna apparatus 100. The active antenna apparatus 100 includes a communication mainboard 200, an antenna feeder group, and an antenna module 400. An antenna array 420 is configured to transmit and receive a wireless signal. A front-end amplifying module 410 is arranged between the antenna feeder group and the antenna array 420, and the front-end amplifying module 410 is integrated with the antenna array 420 in the antenna module 400, such that a noise coefficient can be effectively reduced, gain can be improved, and reliability of wireless signal transmission can be improved advantageously. The communication mainboard 200 transmits a first radio frequency signal TX and a first control signal C0 to a transmission feeding unit 411 through a first transmission line 310, and finally signals are transmitted through the antenna array 420. The communication mainboard 200 transmits a second control signal C1 to a reception feeding unit 412 through a second transmission line 320, and meanwhile, the reception feeding unit 412 transmits a second radio frequency signal RX received by the antenna array 420 to the communication mainboard 200 through the second transmission line 320. Both the first transmission line 310 and the second transmission line 320 may conduct combined transmission of a radio frequency signal and a control signal, and the radio frequency signal and the control signal are separated in the antenna module 400. Through a feeding solution of transmission line multiplexing, a space required for complex feeding network layout can be expanded, and a structure can be miniaturized advantageously.

In an example of the disclosure, the communication device may be a wireless router, a passive optical network (PON) device, or another communication product.

In an example of the disclosure, the communication device is a wireless router. The active antenna apparatus 100 is mounted on the wireless router, miniaturization of the structure can be implemented, and a more reliable and flexible wireless local area network can be built. The communication device may be applied not only to the family, but also to places with high personnel mobility, complex terrain and limited space resources, with a wide range of application scenes.

The example of the disclosure includes: the active antenna apparatus and the communication device. The active antenna apparatus includes the communication mainboard, the antenna feeder group, and the antenna module. The antenna feeder group is connected to the communication mainboard. The antenna feeder group includes the first transmission line and the second transmission line. The first transmission line is configured to transmit the first radio frequency signal and the first control signal. The second transmission line is configured to transmit the second radio frequency signal and the second control signal. The antenna module is connected to the antenna feeder group. The antenna module includes the front-end amplifying module and the antenna array. The front-end amplifying module is arranged between the antenna feeder group and the antenna array. The front-end amplifying module includes the transmission feeding unit and the reception feeding unit. The transmission feeding unit is configured to obtain the first radio frequency signal and the first control signal from the first transmission line. The reception feeding unit is configured to transmit the second radio frequency signal from the antenna array to the communication mainboard through the second transmission line and obtain the second control signal from the second transmission line. According to the solution of the example of the disclosure, the front-end amplifying module is arranged between the antenna feeder group and the antenna array, and the front-end amplifying module is integrated with the antenna array in the antenna module, such that the noise coefficient can be effectively reduced, the gain can be improved, and reliability of wireless signal transmission can be improved advantageously. The communication mainboard transmits the first radio frequency signal and the first control signal to the transmission feeding unit through the first transmission line, and finally the signals are transmitted through the antenna array. The communication mainboard transmits the second control signal to the reception feeding unit through the second transmission line, and meanwhile, the reception feeding unit transmits the second radio frequency signal received by the antenna array to the communication mainboard through the second transmission line. Both the first transmission line and the second transmission line may conduct combined transmission of a radio frequency signal and a control signal, and the radio frequency signal and the control signal are separated in the antenna module. Through the feeding solution of transmission line multiplexing, the space required for complex feeding network layout can be expanded, and a structure can be miniaturized advantageously.

What is claimed is:

1. An active antenna apparatus, comprising:

a communication mainboard;

an antenna feeder group, wherein the antenna feeder group is connected to the communication mainboard, the antenna feeder group comprises a first transmission line and a second transmission line, the first transmission line is configured to transmit a first radio frequency signal and a first control signal, and the second transmission line is configured to transmit a second radio frequency signal and a second control signal; and an antenna module, wherein the antenna module is connected to the antenna feeder group, the antenna module comprises a front-end amplifying module and an antenna array, the front-end amplifying module is arranged between the antenna feeder group and the antenna array, the front-end amplifying module comprises a transmission feeding unit and a reception feeding unit, the transmission feeding unit is configured to obtain the first radio frequency signal and the first control signal from the first transmission line, and the reception feeding unit is configured to transmit the second radio frequency signal from the antenna array to the communication mainboard through the second transmission line and obtain the second control signal from the second transmission line.

2. The active antenna apparatus according to claim 1, wherein the first transmission line comprises a first inner core and a first housing, the first inner core is configured to transmit the first radio frequency signal and the first control signal, the first housing is configured to transmit a direct current level, and the first inner core and the first housing are coaxial; the second transmission line comprises a second inner core and a second housing, the second inner core is configured to transmit the second radio frequency signal and the second control signal, the second housing is used as direct current ground, and the second inner core and the second housing are coaxial.

3. The active antenna apparatus according to claim 1, further comprising a first capacitor, a second capacitor, a first inductor, and a second inductor, wherein the first transmission line is connected to the first capacitor, the second capacitor, the first inductor and the second inductor separately, the communication mainboard transmits the first radio frequency signal to the transmission feeding unit through the first capacitor, the first transmission line, and the second capacitor, and the communication mainboard transmits the first control signal to the transmission feeding unit through the first inductor, the first transmission line, and the second inductor.

4. The active antenna apparatus according to claim 1, further comprising a third capacitor, a fourth capacitor, a third inductor, and a fourth inductor, wherein the second transmission line is connected to the third capacitor, the fourth capacitor, the third inductor and the fourth inductor separately, the reception feeding unit transmits the second radio frequency signal to the communication mainboard through the fourth capacitor, the second transmission line, and the third capacitor, and the communication mainboard transmits the second control signal to the reception feeding unit through the third inductor, the second transmission line, and the fourth inductor.

5. The active antenna apparatus according to claim 1, wherein the front-end amplifying module further comprises a switch unit, the switch unit is connected to the transmission feeding unit, the reception feeding unit and the antenna array separately, the transmission feeding unit transmits the first control signal to the switch unit, the reception feeding unit transmits the second control signal to the switch unit, and the switch unit is configured to be switched to a transmission state or a reception state.

6. The active antenna apparatus according to claim 5, wherein the front-end amplifying module further comprises a power amplifier, the power amplifier is connected to the transmission feeding unit and the switch unit separately, the transmission feeding unit transmits the first radio frequency signal and the first control signal to the power amplifier, the first radio frequency signal is transmitted to the switch unit through the power amplifier, and the transmission feeding unit transmits the first control signal to the switch unit.

7. The active antenna apparatus according to claim 6, wherein the front-end amplifying module further comprises a conversion unit, the conversion unit is connected to the transmission feeding unit and the power amplifier separately, the conversion unit is configured to convert the first control signal to a switch control signal, and a state of the first control signal is opposite to a state of the switch control signal.

8. The active antenna apparatus according to claim 7, wherein the conversion unit comprises an inverter, an input end of the inverter is connected to the transmission feeding unit, and an output end of the inverter is connected to the power amplifier.

9. The active antenna apparatus according to claim 5, wherein the front-end amplifying module further comprises a low-noise amplifier, the low-noise amplifier is connected to the reception feeding unit and the switch unit separately, the reception feeding unit transmits the second control signal to the low-noise amplifier and the switch unit separately, and the switch unit transmits the second radio frequency signal from the antenna array to the reception feeding unit through the low-noise amplifier.

10. The active antenna apparatus according to claim 5, wherein the antenna module further comprises an antenna feeding network, and the antenna feeding network is connected to the switch unit and the antenna array separately.

11. The active antenna apparatus according to claim 1, further comprising a feeding panel, wherein the antenna module is arranged on the feeding panel.

12. The active antenna apparatus according to claim 11, wherein the feeding panel is a Flame Retardant (FR4) dielectric plate.

13. A communication device, comprising an active antenna apparatus, wherein the active antenna apparatus comprises:

a communication mainboard;

an antenna feeder group, wherein the antenna feeder group is connected to the communication mainboard, the antenna feeder group comprises a first transmission line and a second transmission line, the first transmission line is configured to transmit a first radio frequency signal and a first control signal, and the second transmission line is configured to transmit a second radio frequency signal and a second control signal; and an antenna module, wherein the antenna module is connected to the antenna feeder group, the antenna module comprises a front-end amplifying module and an antenna array, the front-end amplifying module is arranged between the antenna feeder group and the antenna array, the front-end amplifying module comprises a transmission feeding unit and a reception feeding unit, the transmission feeding unit is configured to obtain the first radio frequency signal and the first control signal from the first transmission line, and the reception feeding unit is configured to transmit the second radio frequency signal from the antenna array to the communication mainboard through the second transmission line and obtain the second control signal from the second transmission line.

14. The communication device according to claim 13, wherein the first transmission line comprises a first inner core and a first housing, the first inner core is configured to transmit the first radio frequency signal and the first control signal, the first housing is configured to transmit a direct current level, and the first inner core and the first housing are coaxial; the second transmission line comprises a second inner core and a second housing, the second inner core is configured to transmit the second radio frequency signal and the second control signal, the second housing is used as direct current ground, and the second inner core and the second housing are coaxial.

15. The communication device according to claim 13, wherein the active antenna apparatus further comprises a first capacitor, a second capacitor, a first inductor, and a second inductor, wherein the first transmission line is connected to the first capacitor, the second capacitor, the first inductor and the second inductor separately, the communication mainboard transmits the first radio frequency signal to the transmission feeding unit through the first capacitor, the first transmission line, and the second capacitor, and the communication mainboard transmits the first control signal to the transmission feeding unit through the first inductor, the first transmission line, and the second inductor.

16. The communication device according to claim 13, wherein the active antenna apparatus further comprises a third capacitor, a fourth capacitor, a third inductor, and a fourth inductor, wherein the second transmission line is connected to the third capacitor, the fourth capacitor, the third inductor and the fourth inductor separately, the reception feeding unit transmits the second radio frequency signal to the communication mainboard through the fourth capacitor, the second transmission line, and the third capacitor, and the communication mainboard transmits the second control signal to the reception feeding unit through the third inductor, the second transmission line, and the fourth inductor.

17. The communication device according to claim 13, wherein the front-end amplifying module further comprises a switch unit, the switch unit is connected to the transmission feeding unit, the reception feeding unit and the antenna array separately, the transmission feeding unit transmits the first control signal to the switch unit, the reception feeding unit transmits the second control signal to the switch unit, and the switch unit is configured to be switched to a transmission state or a reception state.

18. The communication device according to claim 17, wherein the front-end amplifying module further comprises a power amplifier, the power amplifier is connected to the transmission feeding unit and the switch unit separately, the transmission feeding unit transmits the first radio frequency signal and the first control signal to the power amplifier, the first radio frequency signal is transmitted to the switch unit through the power amplifier, and the transmission feeding unit transmits the first control signal to the switch unit.

19. The communication device according to claim 18, wherein the front-end amplifying module further comprises a conversion unit, the conversion unit is connected to the transmission feeding unit and the power amplifier separately, the conversion unit is configured to convert the first control signal to a switch control signal, and a state of the first control signal is opposite to a state of the switch control signal.

20. The communication device according to claim 19, wherein the conversion unit comprises an inverter, an input end of the inverter is connected to the transmission feeding unit, and an output end of the inverter is connected to the power amplifier.

* * * * *